United States Patent
Tanaka et al.

(10) Patent No.: US 6,735,037 B1
(45) Date of Patent: May 11, 2004

(54) HIGH RELIABILITY STORAGE DRIVE AND DATA WRITE METHOD

(75) Inventors: Hideaki Tanaka, Odawara (JP); Tadaharu Yamashita, Odawara (JP)

(73) Assignee: Hitachi, Ltd., Tokyo (JP)

( * ) Notice: Subject to any disclaimer, the term of this patent is extended or adjusted under 35 U.S.C. 154(b) by 61 days.

(21) Appl. No.: 09/630,143

(22) Filed: Jul. 31, 2000

(30) Foreign Application Priority Data

Mar. 3, 2000 (JP) ........................................ 2000-063291

(51) Int. Cl.[7] .............................................. G11B 21/02
(52) U.S. Cl. ......................... 360/75; 711/163; 711/111
(58) Field of Search ........................ 360/69, 75, 31, 360/55; 711/112, 154, 163, 100, 111; 710/8, 22, 52, 60

(56) References Cited

U.S. PATENT DOCUMENTS

| | | | |
|---|---|---|---|
| 5,175,842 A | 12/1992 | Totani | 395/425 |
| 5,276,840 A | 1/1994 | Yu | 395/425 |
| 5,353,430 A | 10/1994 | Lautzenheiser | 395/425 |
| 5,418,755 A | 5/1995 | Nguyen et al. | 365/230.08 |
| 5,682,273 A | 10/1997 | Hetzler | |
| 5,793,553 A * | 8/1998 | Smith | 360/74.1 |
| 5,799,324 A * | 8/1998 | McNutt et al. | 707/206 |
| 5,870,625 A | 2/1999 | Chan et al. | 395/825 |
| 5,903,916 A | 5/1999 | Pawlowski et al. | 711/167 |
| 5,937,433 A | 8/1999 | Lee et al. | 711/158 |
| 6,134,071 A * | 10/2000 | Andoh et al. | 360/75 |
| 6,366,431 B1 * | 4/2002 | Tsuchiya et al. | 360/245 |
| 6,370,628 B2 | 4/2002 | Beppu | |
| 6,418,510 B1 * | 7/2002 | Lamberts | 711/113 |

FOREIGN PATENT DOCUMENTS

| | | | |
|---|---|---|---|
| CN | 1199899 A | | 11/1998 |
| JP | A-62-84352 | * | 4/1987 |
| JP | 6-236502 | | 8/1994 |
| JP | A-7-44982 | * | 2/1995 |
| JP | 7-239755 | | 9/1996 |
| JP | 9-17099 | | 1/1997 |
| JP | A-10-21653 | * | 1/1998 |

OTHER PUBLICATIONS

T.R.Albrecht et al. "Load/Unload Technology for Disk Drives" IEEE Transactions on Magnetics, vol. 35, No. 2, pp 857–862, Mar. 1999.*
Patent Abstracts of Japan, No. 55157052, Dec. 6, 1980, Disc Cash Control System, Hiroshi.
Patent Abstracts of Japan, No. 04060730, Feb. 26, 1992, Cache Control System, Seiichiro.
Patent Abstracts of Japan, No. 57030170, Feb. 18, 1982, Buffer Memory Control System, Akihiko.

* cited by examiner

*Primary Examiner*—Andrew L. Sniezek
(74) *Attorney, Agent, or Firm*—Antonelli, Terry, Stout & Kraus, LLP

(57) ABSTRACT

A magnetic disk drive capable of shortening a flying time of a magnetic head flying over a magnetic disk and reducing the number of load/unload operations. The disk drive includes a non-volatile memory for temporarily storing data corresponding to a write command supplied from a host. Data corresponding to a plurality of write commands are stored in the non-volatile memory. The head loading is suspended until a predetermined condition is satisfied. When the predetermined condition is satisfied, all the data stored in the non-volatile memory are written in the magnetic disk sequentially at a time. Thereby it is possible to shorten the flying time of the magnetic head flying over the magnetic disk and reduce the number of load/unload operations.

9 Claims, 9 Drawing Sheets

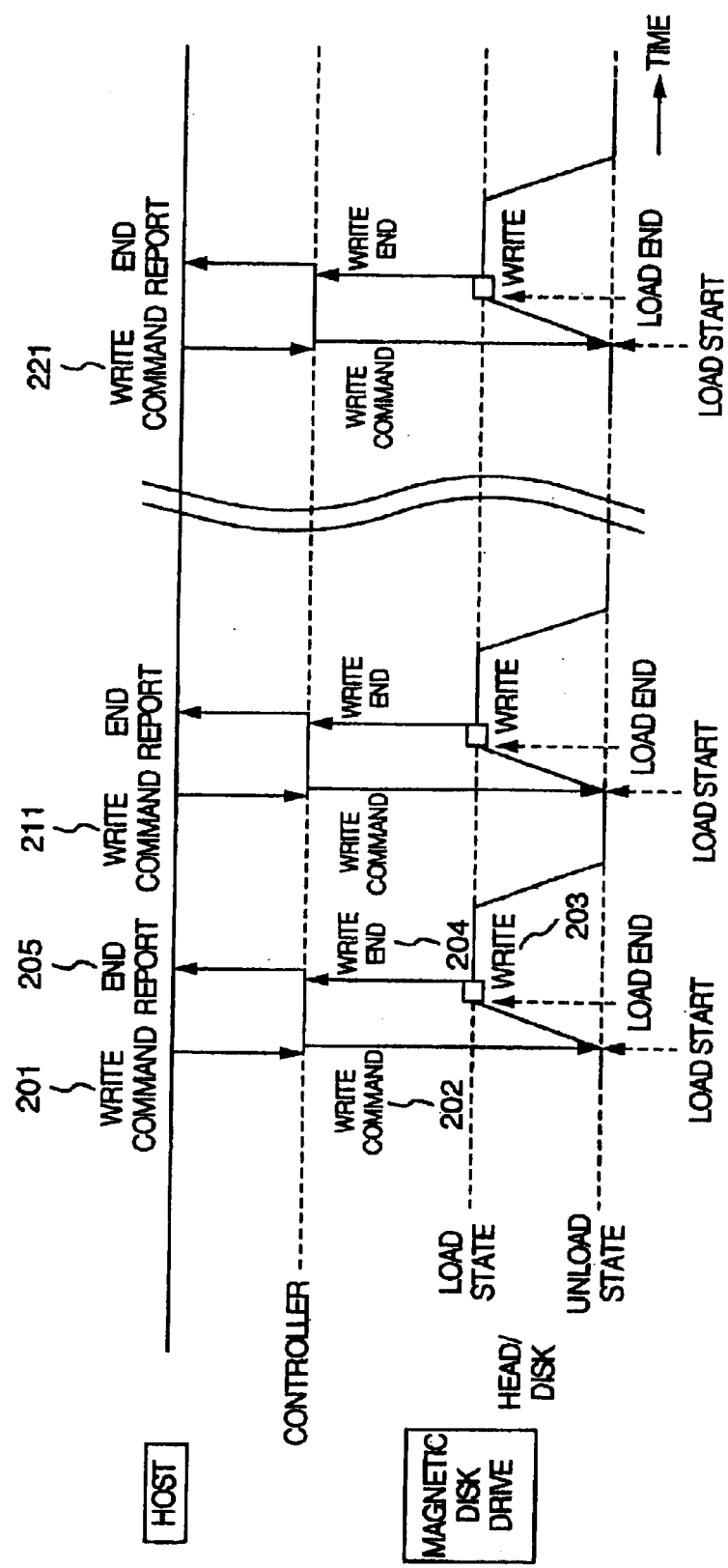

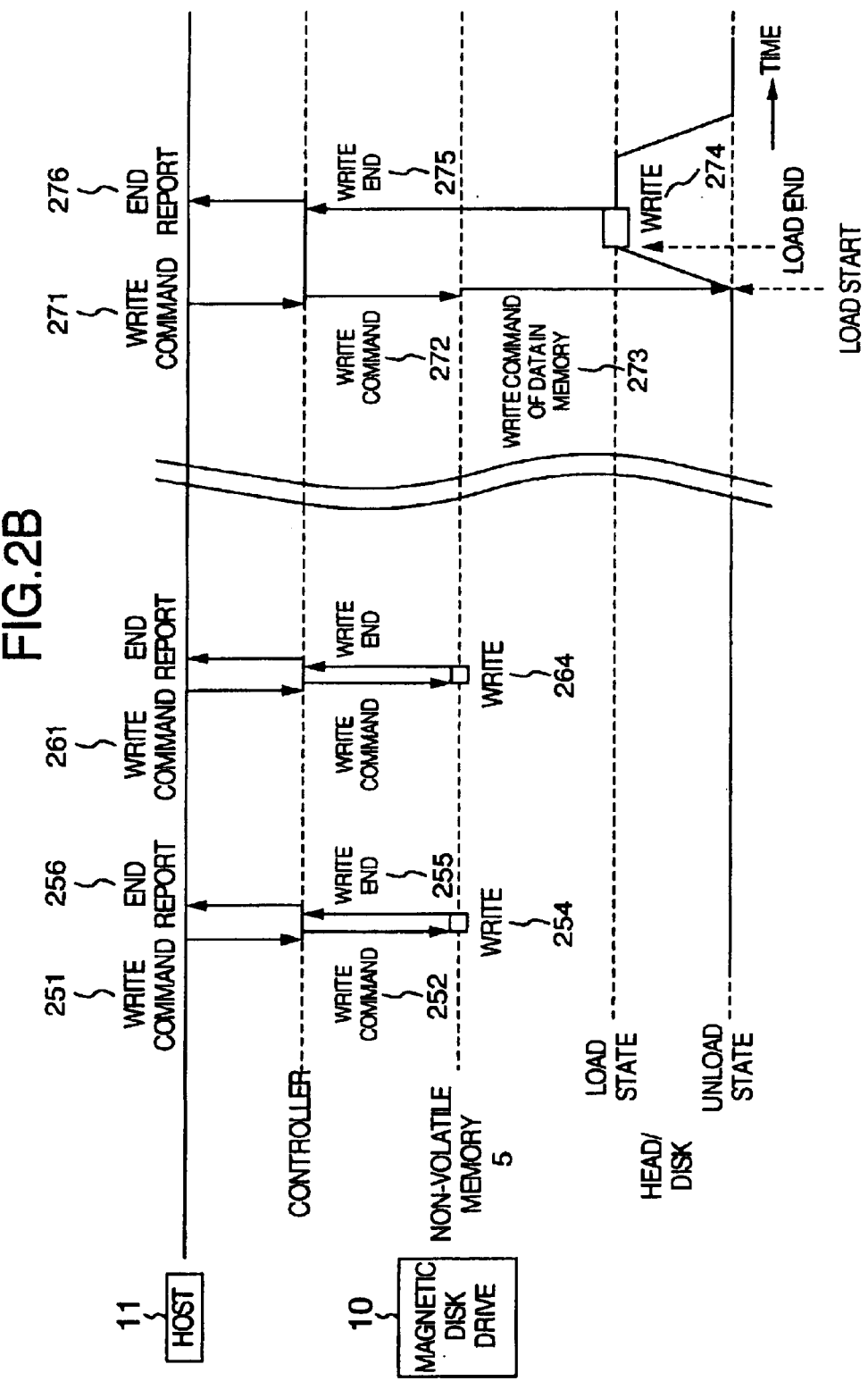

FIG.3

NUMBER OF L/UL OPERATIONS AND HEAD FLYING TIME
OF EMBODIMENT AND COMPARISON EXAMPLE
( PER ONE HOUR TEST TIME )

|  | NO. OF L/UL OPERATIONS | HEAD FLYING TIME (MIN.) |
|---|---|---|
| EMBODIMENT | 34 | 13 |
| COMPARISON EXAMPLE | 90 | 22 |

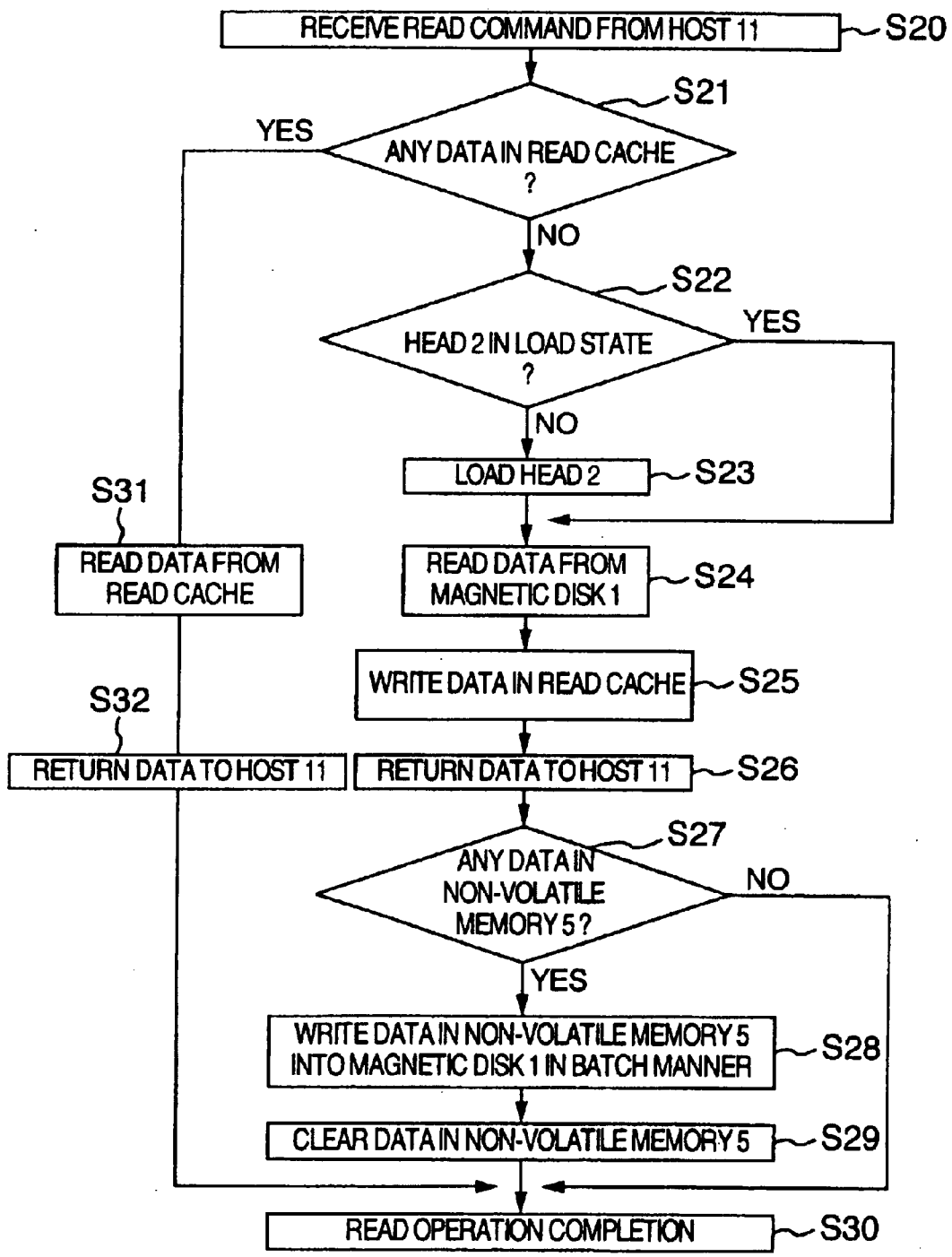

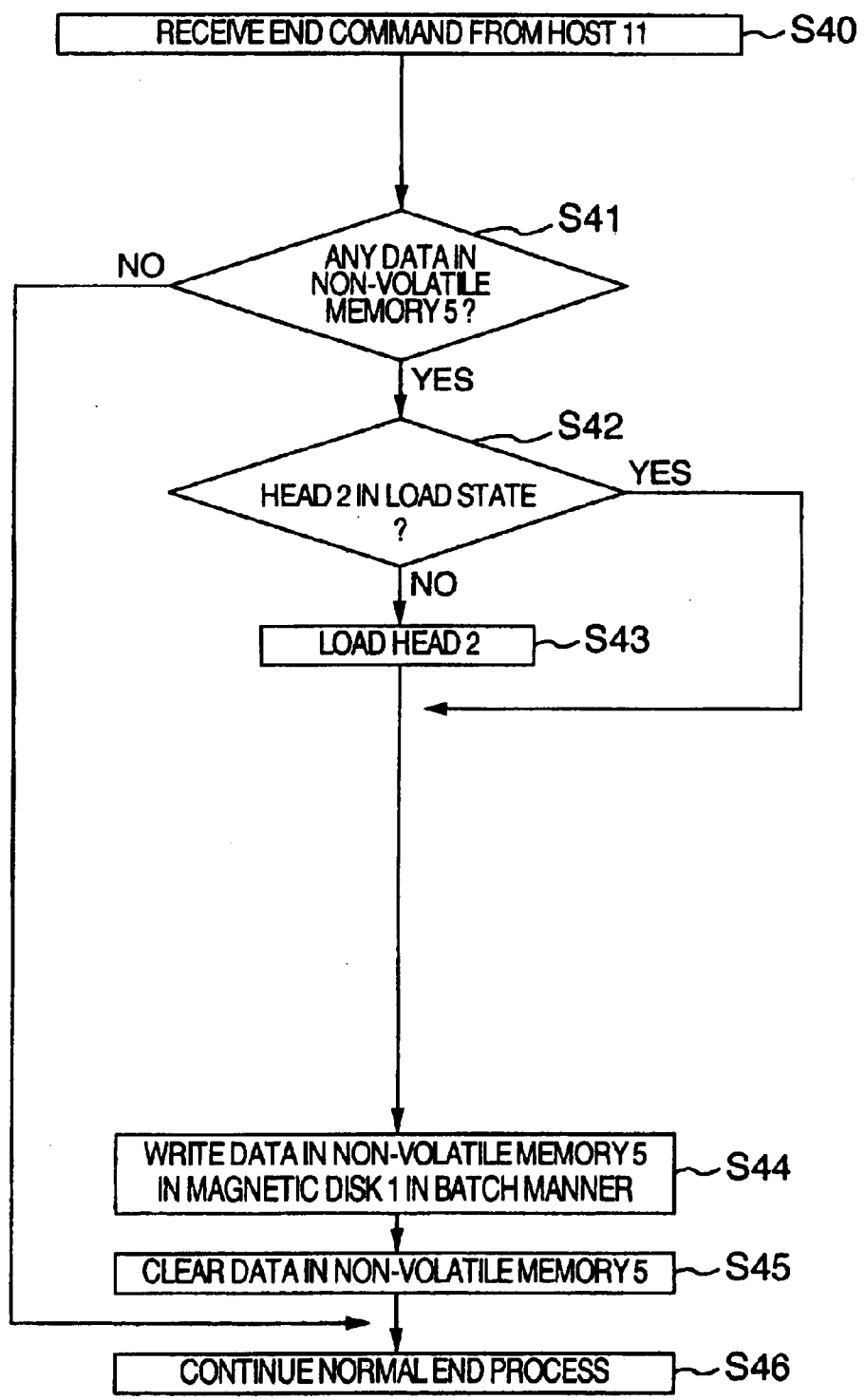

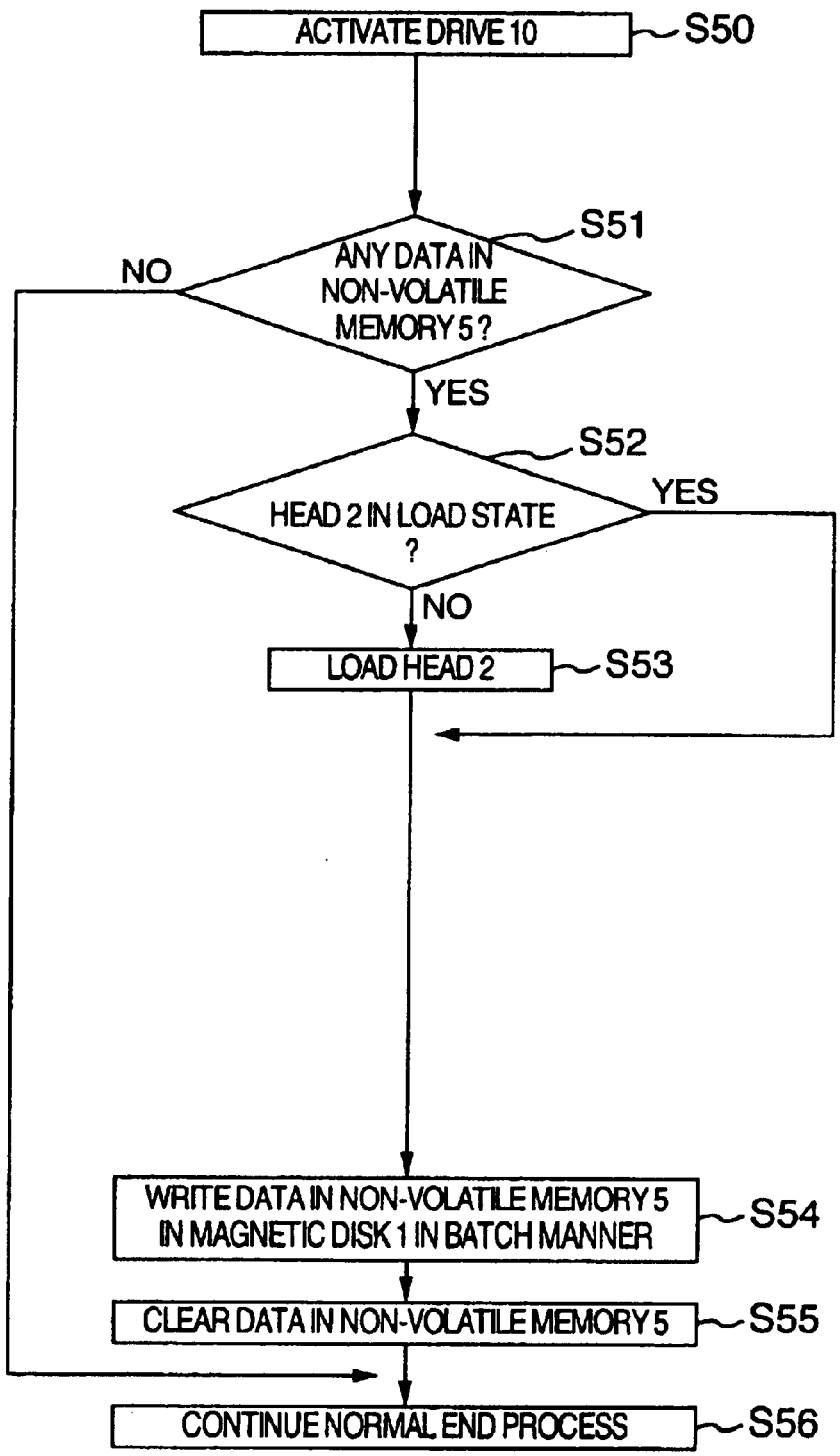

HIGH RELIABILITY STORAGE DRIVE AND DATA WRITE METHOD

BACKGROUND OF THE INVENTION

1. Field of the Invention

The present invention relates to a storage drive such as a magnetic disk drive of a computer, and more particularly to a storage drive with improved tribological reliability even during a long running period, and to its data write method.

2. Description of the Related Art

In order to improve a record density of a recent storage medium, for example, a magnetic disk drive, the shorter a distance (generally called a flying height) between a head and a disk, the better. If the flying height is made low, retaining tribological reliability of a magnetic disk drive becomes an important issue.

Main causes of degrading the tribological reliability of a magnetic disk drive are damages of a head or disk by direct contact therebetween or indirect contact via contamination or the like in the storage drive. As the flying height lowers, a possibility of damages of the head or disk becomes larger as the time while the head flies over the disk becomes longer.

In order to improve the tribological reliability, a load/unload (hereinafter described as L/UL) mechanism has been used. This mechanism shortens the head flying time by retracting the head to an area outside of the disk surface (outside of the outer circumference of the disk) while the magnetic disk drive does not access the disk for read/write or the like. The L/UL mechanism is detailed, for example, in the document "Load/Unload Technology for Disk Drives" by T. R. Albrecht et. al., IEEE Transactions on Magnetics, Vol. 35, No. 2, pp. 857 to 862, March 1999, and in other documents. JP-A-9-17099 (IBM) also discloses technique of varying an unload timing in response to a plurality of commands.

A read cache function is known by which the number of accesses to a disk can be reduced. With read caching, data on the disk having a high access occurrence frequency is temporarily stored in a volatile memory, and when a read command of reading the same data is issued from an upper level device (host), the data is read directly from the volatile memory without accessing the disk.

A function similar to a read cache function is a write cache function for data write. With write caching, data to be written in response to a write command issued by a host is temporarily stored in a volatile memory. The magnetic disc drive notifies the host of a write completion when the data is written in the volatile memory (high speed buffer memory), and at a later timing writes the data on a low speed disk. In this manner, processing speed is increased. More specifically, with write caching, data to be written in response to a plurality of write commands time continuously issued from a host is temporarily stored in a buffer, and after all the write commands are received, all the data in the buffer is written in the disk sequentially.

Write caching technology using both a buffer memory and a non-volatile memory is disclosed in JP-A-7-44982. This technology pertains, however, only to backup of data during a power failure.

SUMMARY OF THE INVENTION

It is desired for the L/UL mechanism to unload a head immediately after a read/write operation in order to shorten the flying time of the head.

The L/UL mechanism is, however, associated with some problems regarding the tribological reliability: contact between the head and disk when the head is loaded or unloaded; wear particles to be formed while a portion (called a tab) of the suspension of the head slides on a slanted surface called a ramp when the head is loaded or unloaded; and the like. In a magnetic disk drive equipped with an L/UL mechanism, it is desired to unload the head immediately after one read/write operation in order to shorten the flying time of the head. However, if the time interval between read/write commands is short, the number of load/unload operations increases abruptly which may result in degraded tribological reliability.

To avoid this abrupt increase in the number of load/unload operations of a magnetic disk drive equipped with an L/UL mechanism, generally the head continues to take the flying state and enters a flying state for a predetermined time after the read/write operation and then enters an unload state. It is therefore difficult to greatly shorten the flying time of a head.

With write caching, while write commands are issued time continuously, the time from a completion of executing one write command to an execution of the next write command is generally in the order of millisecond. During this short time, an unload operation cannot be conducted. Thus, a head continues to fly on a disk until all the write commands are completed. It cannot be expected therefore to reduce the number of load/unload operations and shorten the flying time.

If write commands are issued time discontinuously at some significant time interval, data temporarily stored in a buffer is written on the disk each time the write command is issued although there is some time difference. The number of access times cannot be therefore reduced relative to the number of write commands. Also in this case, it cannot be expected to reduce the number of load/unload operations and shorten the flying time.

The invention described in JP-A-7-44982 does not provide a function of reducing the number of access times relative to write commands, and is not effective in terms of tribological reliability.

If the disk drive is-provided with the L/UL mechanism, the power consumption can be lowered. However, if the number of load/unload operations increases, the effects of lowering the power consumption become less. Therefore, it is necessary to reduce the number of load/unload operations, if such a disk drive is applied to a note PC (personal computer), in order to prolong the lifetime of a battery.

The present invention provides a disk drive and a write control method excellent in tribological reliability even during a long running period, by reducing the number of accesses to a disk in response to write commands time discontinuously issued from a host at some time interval to thereby shorten the head flying time and reduce the number of load/unload operations.

According to one aspect of the present invention, a storage drive such as a disk drive comprises: a storage medium; a head for reading data from, and writing data in, the storage medium; a memory for temporarily storing data corresponding to a plurality of write commands issued from a host to the storage drive until a predetermined condition is satisfied; and a controller for determining the timing to transfer the data stored in the memory into the storage medium, in response to when any one of the predetermined condition is satisfied, wherein when the write command is received from the host, the data corresponding to the write command is temporarily stored the memory and it is checked whether the head flies over the storage medium, if the head flies over the storage medium, the data corresponding to the write command is written in the storage medium.

A storage drive preferably has a load/unload function for retracting the head from the storage medium surface while the write/read operation is not performed to a storage medium.

Many of recent software have the function of saving a file at a predetermined time interval and updating data on a storage medium by reading latest data from a server or the like at a predetermined time interval. Many host computers issue write commands to a storage drive at a predetermined time interval. Therefore, in order to improve tribological reliability of the storage drive even during a long running period, it is important to reduce the number of actual accesses to a storage medium in response to write commands issued time discontinuously at some time interval from a host to thereby shorten the flying time of a head. By reducing the number of accesses to a storage medium, the number of load/unload operations of a storage drive equipped with an L/UL mechanism can be reduced, which greatly contributes to improvement on tribological reliability.

According to another aspect of the present invention, there is provided a storage control method for a magnetic disk including a disk medium, a head for reading data from, and writing data into, the disk medium, a memory for temporarily storing data corresponding to an incoming write command, and a controller for controlling the head and the memory to read/write data from/to the disk medium, comprising the steps of: receiving the incoming write command at the controller; in response to each received incoming write command, determining whether the data is to be written in the temporal memory or in the disk medium; and maintaining the head in an unload state if the controller determines to write the data to the temporary memory.

Other objects, features and advantages of the present invention will become apparent from the description of the following embodiments of the invention taken in conjunction with the accompanying drawings.

BRIEF DESCRIPTION OF THE DRAWINGS

FIGS. 2A and 2B are diagrams illustrating a difference of a response to a write command from a host between a conventional drive and a drive according to an embodiment of the invention.

FIG. 3 shows the measurement results of the number of L/UL operations and a head flying time.

FIG. 5B is a flow chart illustrating the operation of the magnetic disk drive when a read command is received.

FIG. 5C is a flow chart illustrating the operation of the magnetic disk drive when an end command is received.

FIG. 5D is a flow chart illustrating the operation of the magnetic disk drive when the drive starts operating.

DETAILED DESCRIPTION OF THE EMBODIMENTS

Embodiments of the invention will be described in detail with reference to the accompanying drawings.

Figure 1:
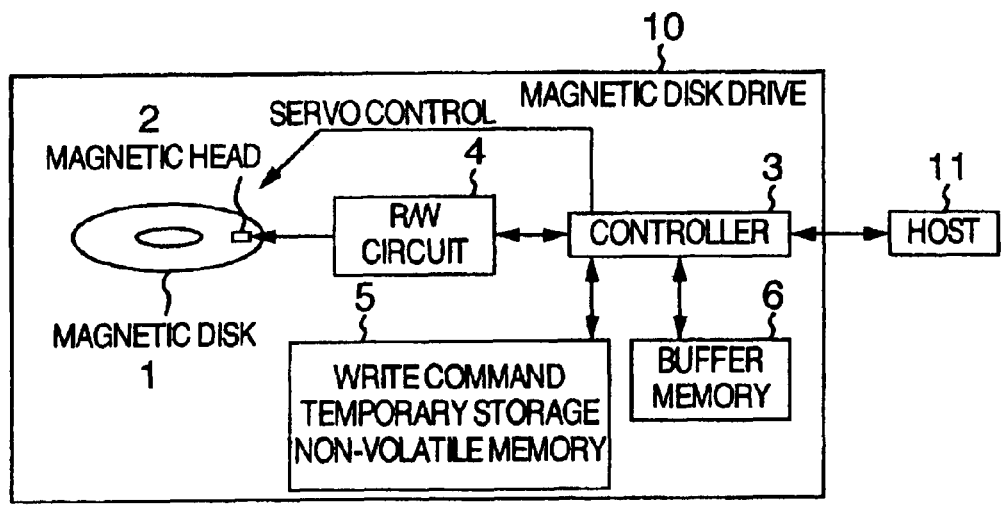
FIG. 1 is a schematic diagram showing the outline structure of a magnetic disk drive of this invention.

The structure of a storage drive embodying the invention will be described by taking a magnetic disk drive as an example. The outline structure of a magnetic disk drive 10 is shown in FIG. 1. The magnetic disk drive 10 includes a storage medium 1, magnetic disk of a 2.5" type; a magnetic head 2 for reading data from and writing data to the magnetic disk 1; a read/write (R/W) circuit 4 for data read/write relative to the disk via the head 2; and a controller 3 for controlling read/write operations relative to the magnetic disk 1 by relaying a command received from a host 11 to the R/W circuit. The magnetic disk drive 10 has also a rotation mechanism for the magnetic disk 1, a motion (including L/UL operation) mechanism for the magnetic disk, and other mechanisms (all not shown).

The magnetic disk drive 10 executes data read/write under the condition that the magnetic head 2 flies over the magnetic disk 1 at a small distance therebetween formed by an air flow generated while the magnetic disk 1 is rotated. In order to improve the record density of the magnetic disk drive 10, the shorter a distance (generally called a flying height) between the magnetic head 2 and magnetic disk 1, the better. The flying height of the magnetic disk drive 10 is therefore set to a very low value of 50 nm or lower.

Although not shown in FIG. 1, the magnetic disk drive 10 includes, for example, two magnetic disks and four magnetic heads, providing a record capacity of about 6.5 GB.

The magnetic disk drive 10 is provided with a load/unload (hereinafter described as L/UL) mechanism which retracts the magnetic head 2 from the area of the magnetic disk 1 while the magnetic head 2 does not access the magnetic disk 1 for read/write or the like. The state that the magnetic head 2 flies over the magnetic disk 1 is called a load state, and the state that the magnetic head 1 is in an area outside of the outer circumference of the magnetic disk 1 is called an unload state. The time (unload transition time) required for the magnetic head 1 to be unloaded after the read/write operation may be set as desired. However, if this time is too short, the number of L/UL operations increases, whereas if this time is too long, the time while the magnetic head 2 flies over the magnetic disk 1 prolongs. In consideration of this balance, the time when the magnetic head is unloaded after there becomes no access to the magnetic disk is preferably 5 to 10 seconds. In this embodiment, if there is no access to the magnetic disk 1 during a period of 6 seconds, the unload operation starts.

This L/UL operation is controlled by the controller 3, and the unload transition time and the like are also controlled by the controller 3. The unload transition time is measured either when the operation of the magnetic head 1 is terminated or when a buffer memory 6 (to be later described) is not accessed from the host or the like.

The magnetic disk drive 10 has as the buffer memory 6, a volatile memory of 512 kB which is used for a read cache or a write cache. This buffer memory 6 has a read cache function of temporarily storing data which is frequently read. The buffer memory 6 has also a write cache function of temporarily storing data in response to a write command from the host 11, prior to writing the data in a non-volatile memory 5, and the data once stored in the buffer memory 6 is again stored in the non-volatile memory. This buffer memory 6 may not be provided as will be later described.

The magnetic disk drive 10 is connected to the host 11 which is an upper level apparatus such as a computer, and is controlled by the command issued from the host 11. The magnetic disk drive 10 of the embodiment has a write command temporary storage non-volatile memory (hereinafter called simply a non-volatile memory) 5 of 256 kB, as means for temporarily storing data corresponding to the write command from the host 11. By using the temporary storage nonvolatile memory, data not written in the magnetic disk 1 can be prevented from being lost even if the power is turned off unexpectedly by power failure or the like.

In the magnetic disk drive 10 constructed as above, when the controller 3 receives a write command from the host 11, the controller 3 first operates to write the data corresponding to the write command in the buffer memory 6. When it is confirmed that the data is written in the buffer memory 6, the controller 3 reports a completion of the write command to the host 11. Thereafter, the controller 3 operates to write the data stored in the buffer memory 6 into the non-volatile memory 5. Similarly, when the second and subsequent write commands are issued from the host 11, the corresponding data is stored in the non-volatile memory 5.

When at least a predetermined condition is satisfied during the above operations repeated, the controller 3 operates to write all the data stored in the non-volatile memory 5 into the magnetic disk 1 in a batch manner. The controller 3 then erases the data in the non-volatile memory 5, that is already written in the magnetic disk 1, among the data in the non-volatile memory 5.

Referring to FIG. 2B, if the buffer memory 6 is not used and when the controller 3 receives a write command issued from the host 11, the data is written in the nonvolatile memory 5. After the data is written, the controller 3 reports a completion of the write command to the host 11. Similarly, when the second and subsequent write commands are issued from the host 11, the corresponding data is stored in the non-volatile memory 5.

When the data in the non-volatile memory 5 is written in the magnetic disk 1, the magnetic head 2 is loaded on the magnetic disk 1 to write the data. After the data is written in the magnetic disk 1, the data temporarily stored in the non-volatile memory is erased to prepare for the next write command. In a series of these operations, assuming that the controller 3 determines to write the data in the non-volatile memory to the magnetic disk 1 upon receipt of the n-th (n is a positive integer) write command, the flying time of the magnetic head 2 for n (n is a positive integer) write commands issued from the host 11 is a time from the load start to a completion of an unload operation. During this time, only one L/UL operation is performed. From the standpoint of the flying time and a reduction of the number of L/UL operations, it is desired to increase the value n to write data corresponding to write commands as many as possible in the magnetic disk 1 at a time.

In the actual operations of the magnetic disk drive 10, not only the write command is issued from the host to the disk drive, but also a read command is issued and the L/UL operation may be performed during execution of this read command. As the interval of commands to be issued changes greatly, even if it is assumed that only write commands are issued, the L/UL operation is not performed in some cases until the next write command is issued, if the interval of write commands to be issued is short. In order to reduce the number of L/UL operations relative to the number of write commands issued from the host 11, it becomes important to judge the timing when all the data stored in the non-volatile memory 5 are written in the magnetic disk sequentially.

In order to shorten the flying time and reduce the number of L/UL operations, data corresponding to write commands is stored in the non-volatile memory 5 as much as possible and written in the magnetic disk 1 in the batch manner. One preferable timing when the data is written in the magnetic disk 1 is the time when the remaining capacity of the non-volatile memory 5 becomes insufficient for temporarily storing the data corresponding to the next write command.

If the magnetic head 2 is loaded on the magnetic disk in response to a read command or the like other than the write command issued from the host 11 to the magnetic disk drive 10, then data write to the magnetic disk 1 becomes possible. In this case, even if the data is written in the magnetic disk 1, the total number of L/UL operations will not increase. Moreover, since the data temporarily stored in the non-volatile memory 5 is erased when the data write is completed, the loading operation of the head at the next batch data write can be prolonged.

If the write command is issued from the host 11 while the magnetic head 2 is in the load state, the controller 3 may write the data directly to the magnetic disk 1 without storing it in the buffer memory 6 or non-volatile memory 5. Also in this case, the total number of L/UL operations will not increase. Moreover, since the data is not written once in the buffer memory 6 or non-volatile memory 5 but is written directly in the magnetic disk 1, the sequential write performance will not be adversely affected.

As described above, even if the capacity of the non-volatile memory 5 is increased, the number of L-UL operations is not necessarily reduced. Therefore, the capacity of the non-volatile memory 5 is determined from various factors such as a necessary reliability degree, use condition, and cost of the magnetic disk drive 10.

When the magnetic disk drive 10 receives a stop command including a transfer to a standby state or a sleep state, it is desired to write data in the memory 6 or 5 into the magnetic disk 1, in order to prevent a rare possibility of data loss during the start-up process after the stop process or after the long period of the power failure state.

Although the data is expected to be written in the magnetic disk 1 upon reception of the stop command, if the power is turned off unexpectedly by the power failure or the like, the data is not written in the magnetic disk 1. In this case, after the magnetic disk drive 10 is started next, it is checked whether the data not written to the magnetic disk 1 is still stored in the non-volatile memory 5. If the data is still stored, the data is written in the magnetic disk 1.

In summary, for actual commercial products of the magnetic disk drive 10, if any one of the following four conditions is satisfied, the controller 11 writes in the magnetic disk 1 the data temporarily stored in the nonvolatile memory 5 from the buffer memory 6 for the write commands issued from the host 11 such as an upper level device, by controlling the R/W circuit 4 and the L/UL operations of the magnetic head by an actuator/servo mechanism (not shown).

(1) When the remaining write capacity of the non-volatile memory 5 becomes insufficient for storing data or when a ratio of the remaining write capacity to the total capacity reaches a predetermined value (e.g., 80%) or lower.

(2) When the magnetic head 2 is loaded on the magnetic disk 1 in response to a command other than the write command issued from the host 11 to the magnetic disk drive 10 and it becomes possible to write data in the magnetic disk 1 (when the magnetic head 2 flies over the magnetic disk 1).

(3) When the magnetic disk drive 10 receives the stop command including the standby command and sleep command from the host 11.

(4) If data remains in the non-volatile memory 5 when the magnetic disk drive 10 starts operating.

If a write command for writing data larger than the remaining write capacity of the non-volatile memory 5 is issued from the host 11, the data is directly recorded via the controller 3 or buffer memory 6 into the magnetic disk 1. By utilizing this load operation, data in the non-volatile memory 5 is also written in the magnetic disk 1 to reduce the total number of load/unload operations.

With the magnetic disk drive 10 connected to the host 11, the magnetic head 2 in an unload state does not access to the magnetic disk to write data. When only a single-shot write commands (e.g., write command for one sector) are issued from the host at a time interval sufficient for executing the L/UL operation (e.g., one minute), unless the remaining write capacity of the non-volatile memory 5 is insufficient for storing the data or the ratio of the remaining write capacity to the total capacity takes a predetermined value or smaller. Therefore, the controller 11 does not execute the load operation of the magnetic head 2 and maintains it in the unload state, in most cases of write commands issued from the host at a predetermined time interval.

Although the effects of shortening the flying time and reducing the number of L/UL operations vary depending upon the scheme of issuing commands from the host 11, the effects can be maintained and cannot be lost by temporarily storing the data corresponding to the write commands issued time discontinuously and by time continuously writing the data in the magnetic disk 1 in a batch manner. It can be understood that the control function by the controller 11 for the R/W circuit operation and L/UL operation may be realized by either hardware or software.

FIGS. 2A and 2B illustrate a comparison example of the number of load/unload operations between the embodiment magnetic disk drive 10 and a conventional magnetic disk drive which respond to write commands discontinuously issued from the host 11 at a predetermined interval. The conventional magnetic disk drive is not provided with the non-volatile memory 5. In this comparison example, for the simplicity of description, the buffer memory for temporarily storing data corresponding to write commands and a write cache function using the buffer memory are not provided.

The time interval of write commands shown in FIGS. 2A and 2B assumes the automatic file save operation by software of the host which provides a time interval (e.g., about several tens seconds to several minutes) sufficient for the L/UL operation. At such time interval, even if the magnetic head 2 is loaded after one write command is executed, the unload operation is executed before the next write command is received.

Referring to FIG. 2A showing the response of the conventional magnetic disk drive, upon reception of the first write command 201 issued from the host, the controller issues a write command 202 for the magnetic disk. If the magnetic head is in the unload state, the magnetic head is loaded in response to the write command 202. After the magnetic head is loaded on the magnetic disk, a write operation 203 of the data in the magnetic disk starts. A square symbol in FIG. 2A indicates the write operation 203 of the data in the magnetic disk. When the controller confirms a write end 204 after the completion of the write operation 203 in the magnetic disk, it returns an end report 205 for the write command 201 to the host to terminate a series of operations. Since the time until the next write command 211 reaches is sufficiently long, the head is unloaded and enters an unload state. When the next write command 211 is issued from the host, the above-described operations are repeated. The time from when the magnetic head finishes to access the magnetic disk and to when the unload operation starts is, for example, 6 seconds similar to the embodiment case.

Each time the same write command is issued from the host at the predetermined time interval, the load operation is executed, the data is written, and thereafter the head is unloaded after a lapse of a predetermined wait time.

In a series of these operations, the head flying time for n write commands 221 is T×n where T is the time from the load start to the unload end (T is variable depending upon the amount of write data). The corresponding number of L/UL operations is n. This number of L/UL is the same also for a disk drive provided with the write cache function, although the timings of the end report to the host and the data write to the disk are different.

In the embodiment magnetic disk drive 10, upon reception of the first write command 251 issued from the host 11, the controller 3 issues a write command 252 to the non-volatile memory 5 to perform a write operation 254 of the data in the non-volatile memory 5. After the controller 3 confirms the write end 255 of the data in the non-volatile memory 5, the controller 3 issues an end report 256 for the write command 251. When the next write command 261 is issued from the host 11, the data is recorded in the non-volatile memory (264) in the similar manner described above.

While the above operations are repeated, if any of the above-described four conditions is satisfied, i.e., when the n-th write command 271 shown in FIG. 2B is received, the controller 3 issues a batch write command 273 to the non-volatile memory 5 to write the data stored in the non-volatile memory 5 into the magnetic disk 1.

In response to this batch write command 273, the magnetic head 2 is loaded on the magnetic disk 1. After the magnetic head 2 is loaded on the magnetic disk 1, a write operation 274 starts for the data stored in the non-volatile memory 5 in a batch manner. After the batch write operation 274, the controller 3 receives a write end 275, issues an end report 276 to the host 276, and erases the data stored in the non-volatile memory 5. The amount of the data to be written in the magnetic disk 1 in response to the write command 272 is different from that corresponding to one write command. Therefore, the time required for the write operation 274 becomes longer than that of the conventional case. Therefore, the write end 275 and end report 276 are delayed more than the conventional case. However, if the write cache function using the buffer memory 5 is provided and the write end 275 and end report 276 are returned, the delay of the end report 276 can be set to the degree similar to the conventional case. From the standpoint of improving the process speed of the magnetic disk drive 10, it is therefore preferable to provide both the non-volatile memory 5 and buffer memory 6.

After issuing the write command 272 to the non-volatile memory 5, the controller 3 may issue the write command 273 for the magnetic disk 1, and thereafter the data stored in the non-volatile memory 5 together with the data corresponding to the write command 272 are recorded in the magnetic disk 1 in the batch manner. To explicitly indicate this, the write command 273 is drawn as extending from the non-volatile memory 5. However, if the controller 3 receives the information that any one of the four conditions has been satisfied before the write command 272 is issued, then without issuing the write command 272 the controller 3 issues the write command 273 to write the data stored in the non-volatile memory 5 into the magnetic disk 1 and write the data corresponding to the write command 271 issued from the host 271 in the magnetic disk 1 without storing it in the non-volatile memory 5.

The magnetic disk drive 10 of this embodiment writes data in the magnetic disk 1 in the above manner. It is therefore possible to reduce the number of L/UL operations of the magnetic head 1 by 1/n and shorten the flying time of the magnetic head 1, relative to the write commands issued from the host 11 time discontinuously at a predetermined time interval. It is therefore possible to considerably prevent degradation of the tribological reliability which may be otherwise caused by the magnetic head flying in a long term or by the L/UL operation. Since unnecessary L/UL operations are not executed, the power consumption of the magnetic disk drive can be reduced.

In FIGS. 2A and 2B, for the simplicity of description, single-shot write commands are issued at a predetermined time interval. Even if sets of a plurality of time continuous write commands are issued at a predetermined time interval, the operations are approximately similar to those described above. Namely, assuming that the number of write commands corresponds to the number of sets of a plurality of time continuous write commands, the response of the magnetic disk drive is approximately similar to that described above.

In this invention, the time interval of commands issued by the host 11 is an important factor. If the controller 3 receives a command from the host 11 and the next command is issued before the first command is completely processed, then a waiting state for receiving and processing the next command occurs. In this embodiment, such commands are called time continuous commands. On the other hand, if the controller 3 receives a command from the host 11 and the next command is issued after the lapse of the time sufficient for processing the first command, then such commands are called time discontinuous commands.

In the conventional case, when commands are time discontinuous but some command intervals are less than the unload transition time, the number of L/UL operations for time discontinuous commands issued from the host 11 may be smaller than n.

In this embodiment, when the read command for the data temporarily stored in the non-volatile memory 5 is issued, the data may be read directly from the non-volatile memory 5. In this case, the non-volatile memory provides a pseudo-read-cache function so that the process speed can be improved. The non-volatile memory 5 stores only the data before it is written in the magnetic disk 1 and the read speed of a non-volatile memory is generally slower than a volatile memory generally used as a read cache. Therefore, it is preferable to use the buffer memory 6 of a volatile memory and provide the read cache function for temporarily storing the data read from the magnetic disk 1.

As described earlier, with read caching, the data in the magnetic disk 1 having a high access frequency is temporarily stored in the buffer memory 6, and when the read command for the same data is issued, the data is read from the buffer 6 without accessing the magnetic disk 1. Since the process speed can be improved and the access frequency to the magnetic disk 1 can be reduced, the flying time can be further shortened and the number of L/UL operations can be further reduced by incorporating the read cashing together with the embodiment method.

A general operation of the magnetic disk drive of this embodiment having a read/write cache will be described with reference to the flow charts shown in FIGS. 5A to 5C.

Figure 5A:
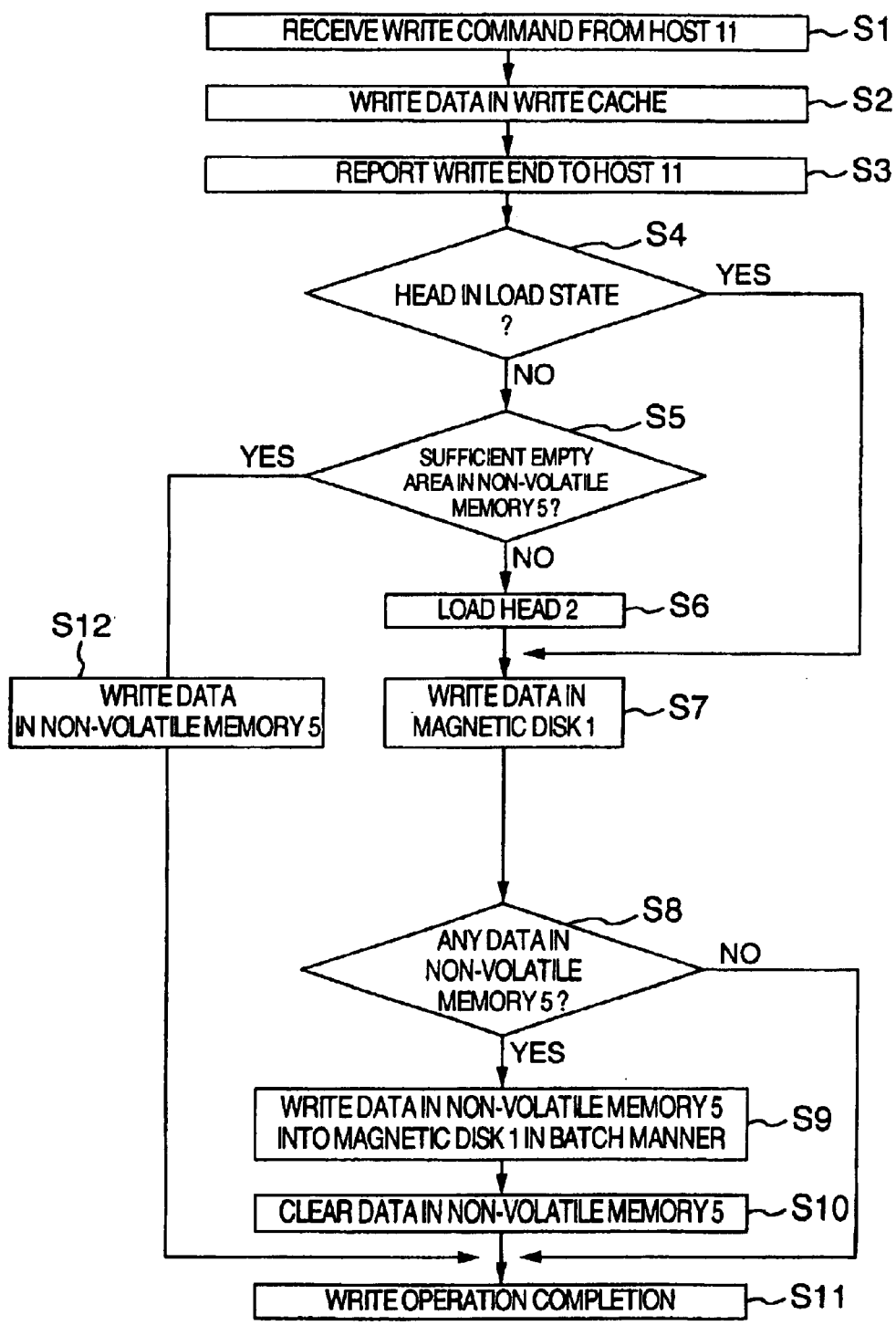
FIG. 5A is a flow chart illustrating the operation of the magnetic disk drive when a write command is received.

FIG. 5A is a flow chart illustrating the operation of the magnetic disk drive when a write command is received, FIG. 5B is a flow chart illustrating the operation of the magnetic disk drive when a read command is received, FIG. 5C is a flow chart illustrating the operation of the magnetic disk drive when an end command is received, and FIG. 5D is a flow chart illustrating the operation of the magnetic disk drive when the drive starts operating.

As shown in FIG. 5A, when a write command is received from the host 11 at Step S1, the data is written in a write cache at Step S2. After the data is written in the write cache, a write end report is returned to the host 11 at Step S3. It is checked at Step S4 whether the head 2 is in the load state. If in the load state, the flow skips to Step S7, whereas if not, the flow advances to Step S5.

At Step S5 it is checked whether the non-volatile memory 5 has a sufficient empty space. If it has a sufficient empty area, the flow advances to Step S12, whereas if it has not a sufficient empty area, the flow advances to Step S6.

At Step S12, the data is written in the nonvolatile memory 5 to thereafter terminate the write operation at Step S11.

At Step S6, the head 2 is loaded. Then, the data is written in the magnetic disk 1. It is then checked at Step S8 whether the non-volatile memory 5 has any data. If it has any data, the flow advances to Step S9, whereas it has no data, the flow advances to Step S11 to terminate the write operation.

At Step S9 all the data in the non-volatile memory are written in the magnetic disk 1 sequentially at a time. At Step S10, the data in the non-volatile memory 5 is cleared to thereafter terminate the write operation at Step S11.

As shown in FIG. 5B, when a read command is received from the host 11 at Step S20, it is checked at Step S21 whether the data is in a read cache. If in the read cache, the flow advances to Step S31, whereas if not, the flow advances to Step S22.

At Step S31 the data is read from the read cache, and at Step S32 the data is returned to the host 11 to thereafter terminate the read operation at Step S30.

At Step S22 it is checked whether the head is loaded. If loaded, the flow skips to Step S24, whereas if not, the flow advances to Step S23.

At Step S23, the head 1 is loaded. At step S24 the data is read from the magnetic disk 1. At Step S25, the data is written in the read cache. Thereafter, at Step S26 the data is returned to the host 11. It is then checked at Step S27 whether the non-volatile memory 5 has any data. If it has any data, the flow advances to Step S28, whereas it has no data, the flow skips to Step S30 to terminate the read operation.

At Step S28 all the data in the non-volatile memory 5 are written in the magnetic disk 1 sequentially at a time. At Step S29, the data in the non-volatile memory 5 is cleared to thereafter terminate the read operation at Step S30.

As shown in FIG. 5C, when an end command is received from the host 11 at Step S40, it is checked at Step S41 whether the non-volatile memory 5 has any data. If it has any data, the flow advances to Step S42, whereas it has not any data, the flow skips to Step S46 whereat the normal end process continues.

At Step S42, it is checked whether the head is in the load state. If in the load state, the flow skips to Step S44, whereas if not, the flow advances to Step S43.

At Step S43, the head is loaded. At Step S44 the data in the non-volatile memory 5 is written in the magnetic disk 1 in the batch manner. At Step S45 the data in the non-volatile memory 5 is cleared to continue the normal end process at Step S46.

As shown in FIG. 5D, when the magnetic disk drive 10 is activated at Step S50, it is checked at Step S51 whether the non-volatile memory 5 has any data. If it has any data, the flow advances to Step S52, whereas it has not any data, the flow skips to Step S56 whereat the normal start-up operation continues.

At Step S52, it is checked whether the head is in the load state. If in the load state, the flow skips to Step S54, whereas if not, the flow advances to Step S53.

At Step S53, the head is loaded. At Step S54 all the data in the non-volatile memory 5 are written in the magnetic disk 1 sequentially at a time. At Step S55 the data in the non-volatile memory 5 is cleared to continue the normal start-up process at Step S56.

The magnetic disk drives of the embodiment and the comparison example were built in a note PC, and the response of the magnetic disk drive relative to commands from the host was measured by using a commercially available battery benchmark tool, the host being a CPU of the note PC. The same result was obtained even if the magnetic disk drive was externally connected to the note PC.

The battery benchmark tool generates write and read commands of a predetermined pattern and supplies them to the magnetic disk drive. The response of the magnetic disk drive was measured by monitoring current consumed by the magnetic disk drive with a current probe. When the load or unload operation is performed, a current pattern is characteristic to each operation flows, so that the execution of the L/UL operation can be measured correctly by monitoring the current. Based upon this measurement, the number of L/UL operations was obtained and the flying time while the magnetic head flies over the magnetic disk was calculated as the sum of each time from the load operation to the unload operation.

The same note PC was used for both the magnetic disk drives of the embodiment and the comparison example. Each test was conducted under the same conditions during one hour. The measurement results are shown in FIG. 3.

The number of L/UL operations of the magnetic disk drive of the embodiment was reduced to about 62% of the comparison example, and the head flying time was shortened to about 41% of the comparison example. The battery benchmark tool issued a combination of write and read commands simulating an actual use state of a magnetic disk drive. Therefore, the response of the magnetic disk drive became more complicate than the case where only the write commands are issued as shown in FIGS. 2A and 2B.

Commands issued from the host to the embodiment magnetic disk drive were checked by monitoring the bus, and the contents of the command immediately before the load operation is performed were checked. It was confirmed that all the commands immediately before the load operations were the read commands, and that the load operation was not performed in response to the write command. This is because the condition (2) of the four conditions of writing the data in the non-volatile memory into the magnetic disk in the batch manner was satisfied frequently since the test conditions used were to issue a combination of write and read commands.

Figure 4A:
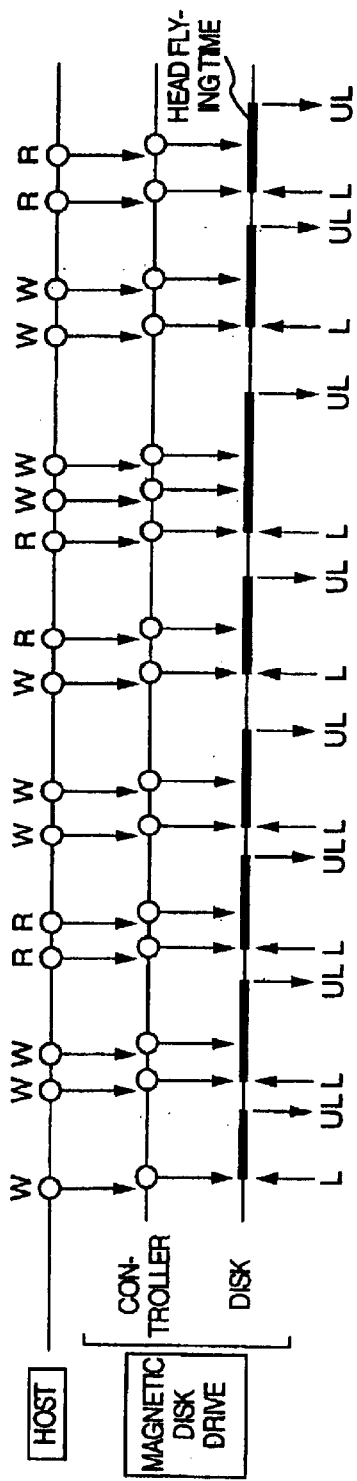
FIGS. 4A and 4B are diagrams illustrating a difference of a response to a read/write command from a host between a conventional drive and a drive according to an embodiment of the invention.
Figure 4B:
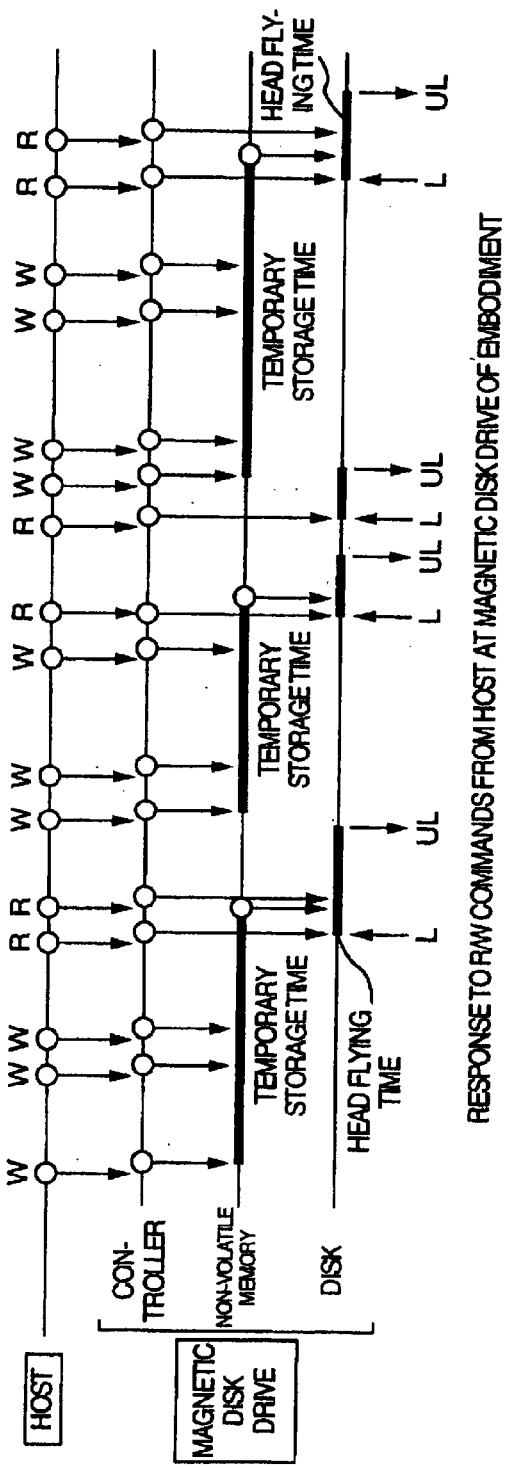

The responses of the magnetic disk drives under these test conditions are schematically shown in FIGS. 4A and 4B. In FIGS. 4A and 4B, for the simplicity of description, read caching and write caching are not used. In FIGS. 4A and 4B, a letter W represents a write command issued, a letter R represents a read command issued, and a symbol UL represents the head unload operation executed. Bold lines on the disk line indicate the time while the head flies, and bold lines on the non-volatile memory represent the time while data for a write command is temporarily stored in the non-volatile memory.

In the conventional magnetic disk drive, a disk access occurs each time the write or read command is issued. If the head is not in the load state when the command is issued, the load operation is performed. If a command is not issued thereafter in a predetermined time, the head unload operation is executed. In the embodiment magnetic disk drive, when the write command is received, the data is stored in the non-volatile memory. Therefore, when the head is loaded in response to the read command and the read command is processed completely, the data temporarily stored in the non-volatile memory is written in the disk in the batch manner because the judgement condition (2) is satisfied. As seen from the comparison between the embodiment (FIG. 4B) and the comparison example (FIG. 4A), it can be understood that the head flying time is shortened and the number of L/UL operations is reduced.

The effects of shortening the flying time and reducing the number of L/UL operations are still distinctive as described above in the case where a combination of write and read commands simulating the use state of a magnetic disk drive, is issued. The effects was confirmed also in practical use states of the magnetic disk drive.

The effects of the invention was verified by conducting a reliability acceleration test of a long term of 5000 hours by preparing ten embodiment magnetic disk drives and ten comparison example magnetic disk drives. Test conditions used were high temperature severe conditions at an environment temperature of 70° C., and commands similar to those of the battery benchmark tool were issued to monitor the time taken to generate an error. In this test, in order to shorten the evaluation time, a command issue pattern was used which was obtained by removing an idle period while the command is not issued for a long time from the command issue pattern of the battery benchmark tool. With this command issue pattern, the number of L/UL operations and the head flying time per unit time were about twice as those shown in FIG. 3.

Two of the ten comparison example magnetic disk drives stopped near at 4000 hours because of generation of an error. The stopped magnetic disk drives were disassembled and checked. It was found that stains attached near to the head element generate the error. The components of the stains were analyzed, and the contamination components of organic compound in the magnetic disk drive and the components identified as wear particles of ramps of the L/UL mechanism were detected. At the time of 4000 hours of the comparison example, the number of L/UL operations was about $720\times10^3$ and the head flying time was about 3000 hours. The remaining eight magnetic disk drives did not generate an error, but disassembly of these drives confirmed stains attached to the head, although the amount of stains is not so large as the error generated magnetic disk drives. At the time of 5000 hours of the comparison example, the number of L/UL operations was about $900\times10^3$ and the head flying time was about 3700 hours.

None of the ten embodiment example magnetic disk drives generated an error even at 5000 hours. The magnetic disk drives were disassembled. Although stains were attached to some degree to the head, the amount of attached stains was small as compared with the comparison example magnetic disk drives which did not generate an error. At the time of 5000 hours of the embodiment, the number of L/UL operations was about 340×10³ and the head flying time was about 2200 hours.

As described above, magnetic disk drives excellent in the tribological reliability in the long running time were obtained by reducing the number of L/UL operations and shortening the head flying time.

In the above description, the magnetic disk drive 10 mounted with the L/UL mechanism has been used by way of example. The invention is applicable to magnetic disk drives of a contact start stop (CSS) type. Many magnetic disk drives of the CSS type provide a function of entering the standby state when a command is not issued for a long time. In this case, when a write command is issued from the host after the head enters the standby state, it is necessary that the spindle is again activated to fly the head and write the data in the magnetic disk. According to the present invention, since the data is written in the non-volatile memory, it is not necessary to again activate the spindle. Therefore, the flying time is shortened and the number of CSS operations is reduced to improve the tribological reliability considerably and lower the consumption power.

In the CSS type, of the four conditions, a portion of the condition (2) "When the magnetic head 2 is loaded on the magnetic disk 1" is omitted, and the condition (2) is replaced simply by "When the magnetic head 2 flies over the magnetic disk 1 and it becomes possible to write data in the magnetic disk 1".

The invention is also effective not only for the magnetic disk, but also for other storage drive necessary for improvement on the tribological reliability or reduction of power consumption, such as optical disks, magneto-optical disks and magnetic tapes. The invention is also effective for a drive using a storage medium which does not require the improvement on the tribological reliability but requires the reduction of consumption power.

The function of the non-volatile memory 5 may be added to the function of the buffer memory 6. In this case, if power failure of the magnetic disk drive 10 occurs before the data is written in the magnetic disk 1, the data is lost. However, the data can be retained if a backup power source is provided which can supply a power to the buffer memory until the data is written in the magnetic disk 1. By providing the buffer memory 6 of a volatile memory with the function of the non-volatile memory 5, the time taken to write data in the magnetic disk in the batch manner can be shortened. Data in the unit of byte can be written in the volatile memory. Therefore, the memory capacity can be effectively utilized and the amount of data to be temporarily stored can be increased more than that of a non-volatile memory having the same capacity.

Instead of mounting the non-volatile memory 5 in the magnetic disk drive 10, it may be provided between the host 11 and magnetic disk drive 10 or in the host 11. More specifically, if the host 11 is a PC, data corresponding to write command is stored in a cache of PC and the data is written in the magnetic disk drive 10 to reduce the number of L/UL operations.

The invention is applied to various applications in a wide range. In summary of the invention, upon receipt of a write command issued from the host the data is temporarily stored in a memory, which is not always sequentially followed by writing the data from the temporary memory to a storage medium such as a magnetic disk, and all the data stored in the temporary memory corresponding to the plural write commands are written in the storage medium later sequentially at a time.

What is claimed is:

1. A storage drive comprising:

a storage medium;

a head for reading data from, and writing data in, said storage medium;

a load/unload mechanism which loads and unloads said head on said storage medium;

a non-volatile memory which stores data corresponding to a write command issued from a host; and a controller which judges whether said head is in a load state or in an unload state when the controller receives said write command issued from said host, controls said head to write data corresponding to said write command into said storage medium when judging said head is in the load state, and controls temporally to write said data in said non-volatile memory to thereby maintain the unload state of said head when judging said head is in the unload state.

2. A storage drive comprising:

a storage medium;

a head for reading data from, and writing data in, said storage medium;

a load/unload mechanism which loads and unloads said head on said storage medium;

a non-volatile memory which stores data corresponding to a write command issued from a host; and a controller which writes data corresponding to said write command to said non-volatile memory in response to satisfaction of a first predetermined condition to maintain an unload state of said head;

wherein data stored in said non-volatile memory are written in said storage medium in response to satisfaction of a second predetermined condition; and wherein said second predetermined condition is when a read command is received from said host to reproduce information from said storage medium.

3. A storage drive according to claim 2, wherein said first predetermined condition is when a remaining capacity of said non-volatile memory is sufficient to store said data corresponding to said write command.

4. A data write method comprising the steps of:

receiving a write command from a host;

judging whether a head is in a load state or in an unload state; and when judging said head is in the load state, writing data corresponding to said write command into a storage medium, and when judging said head is in the unload state, temporally writing said data in a non-volatile memory to thereby maintain the unload state of said head.

5. A data write method comprising the steps of:

receiving a write command from a host;

judging whether a head is in a load state or in an unload state;

writing data corresponding to said write command from said host into a non-volatile memory in response to satisfaction of a first predetermined condition to thereby maintain the unload state of said head; and writing said data stored in said non-volatile memory into a storage medium in response to satisfaction of a second predetermined condition.

6. A data write method according to claim 5, wherein said first predetermined condition is when a remaining capacity of said non-volatile memory is sufficient to store said data.

7. A data write method according to claim 5, wherein said second predetermined condition is that a read command is received from said host to reproduce information from said storage medium.

8. A storage drive comprising:
- a storage medium;
- a head for reading data from, and writing data in, said storage medium;
- a load/unload mechanism which loads and unloads said head on said storage medium;
- a non-volatile memory which stores data corresponding to a write command issued from a host; and
- a controller which judges whether said head is in a load state or in an unload state, and when said controller receives said write command issued from said host, controls to write data corresponding to said write command in said non-volatile memory and controls to thereby maintain the unload state of said head when judging said head is in the unload state as a first condition and when judging the storage drive satisfies a first predetermined condition as a second condition, or controls said head to write said data corresponding to said write command into said storage medium when judging the storage drive does not satisfy the first and second conditions.

9. A storage drive according to claim 8, wherein said first predetermined condition is when a read command is received from said host to reproduce information from said storage medium.

* * * * *